United States Patent [19]
Jervis

[11] Patent Number: 5,173,573
[45] Date of Patent: Dec. 22, 1992

[54] HERMAPHRODITIC GEL CLOSURE

[75] Inventor: James E. Jervis, Atherton, Calif.

[73] Assignee: Raychem Corporation, Menlo Park, Calif.

[21] Appl. No.: 669,837

[22] Filed: Mar. 15, 1991

[51] Int. Cl.⁵ .............................................. H01B 17/00
[52] U.S. Cl. .................................. 174/138 F; 174/76; 439/521
[58] Field of Search ...................... 174/76, 92, 138 F; 439/367, 519, 520, 521, 731, 892

[56] References Cited

U.S. PATENT DOCUMENTS

| | | | |
|---|---|---|---|
| 4,600,261 | 7/1986 | Debbaut | 339/116 C |
| 4,610,738 | 9/1986 | Jervis | 174/92 X |
| 4,634,207 | 1/1987 | Debbaut | 339/116 C |
| 4,859,809 | 8/1989 | Jervis | 174/92 |
| 4,909,756 | 3/1990 | Jervis | 439/521 |
| 4,942,270 | 7/1990 | Gamarra | 174/93 |
| 4,998,894 | 3/1991 | Gronvall | 439/521 |

Primary Examiner—Leo P. Picard
Assistant Examiner—Trinidad Korka
Attorney, Agent, or Firm—A. Stephen Zavell; Herb Burkard

[57] ABSTRACT

A hermaphroditic enclosure especially adapted to gel seal an elongate substrate and particularly a coaxial cable splice.

10 Claims, 6 Drawing Sheets

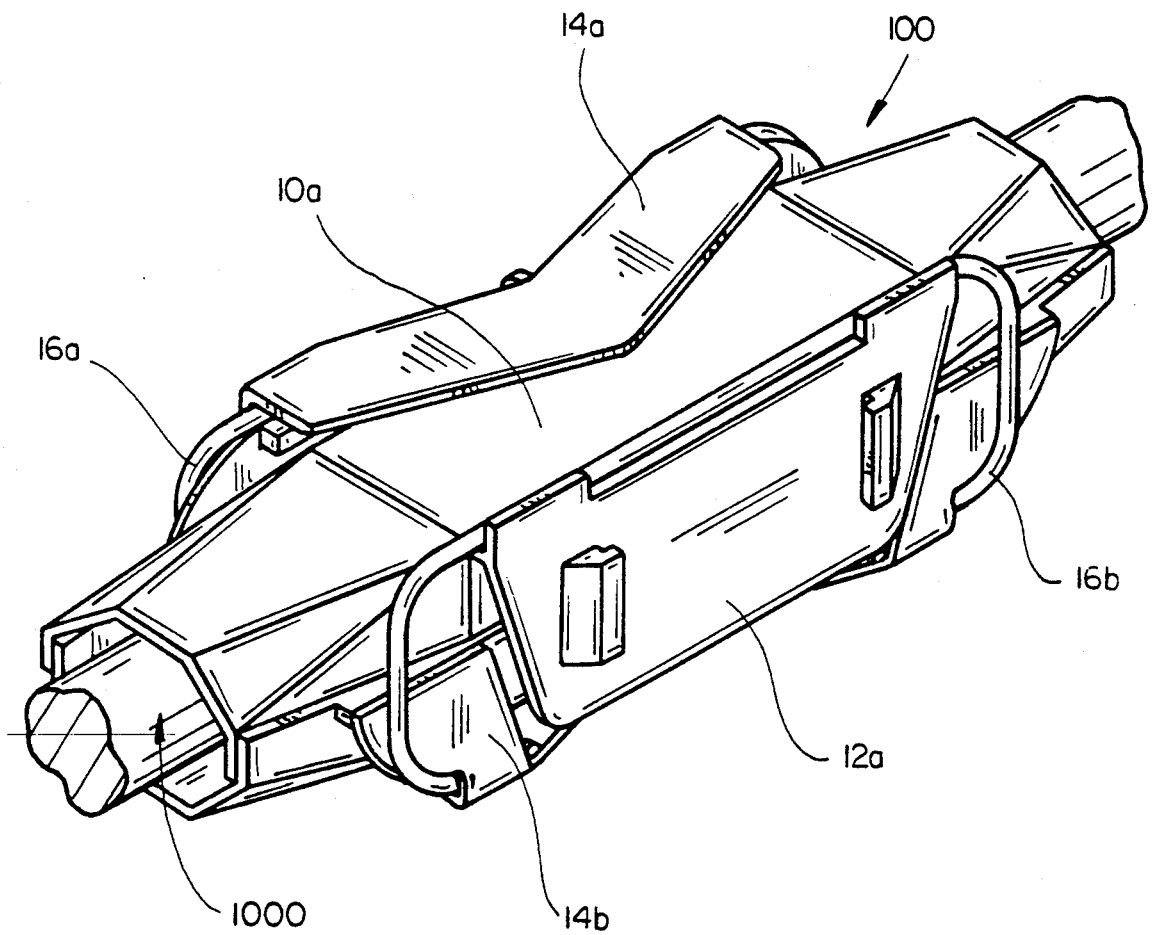
FIG_1

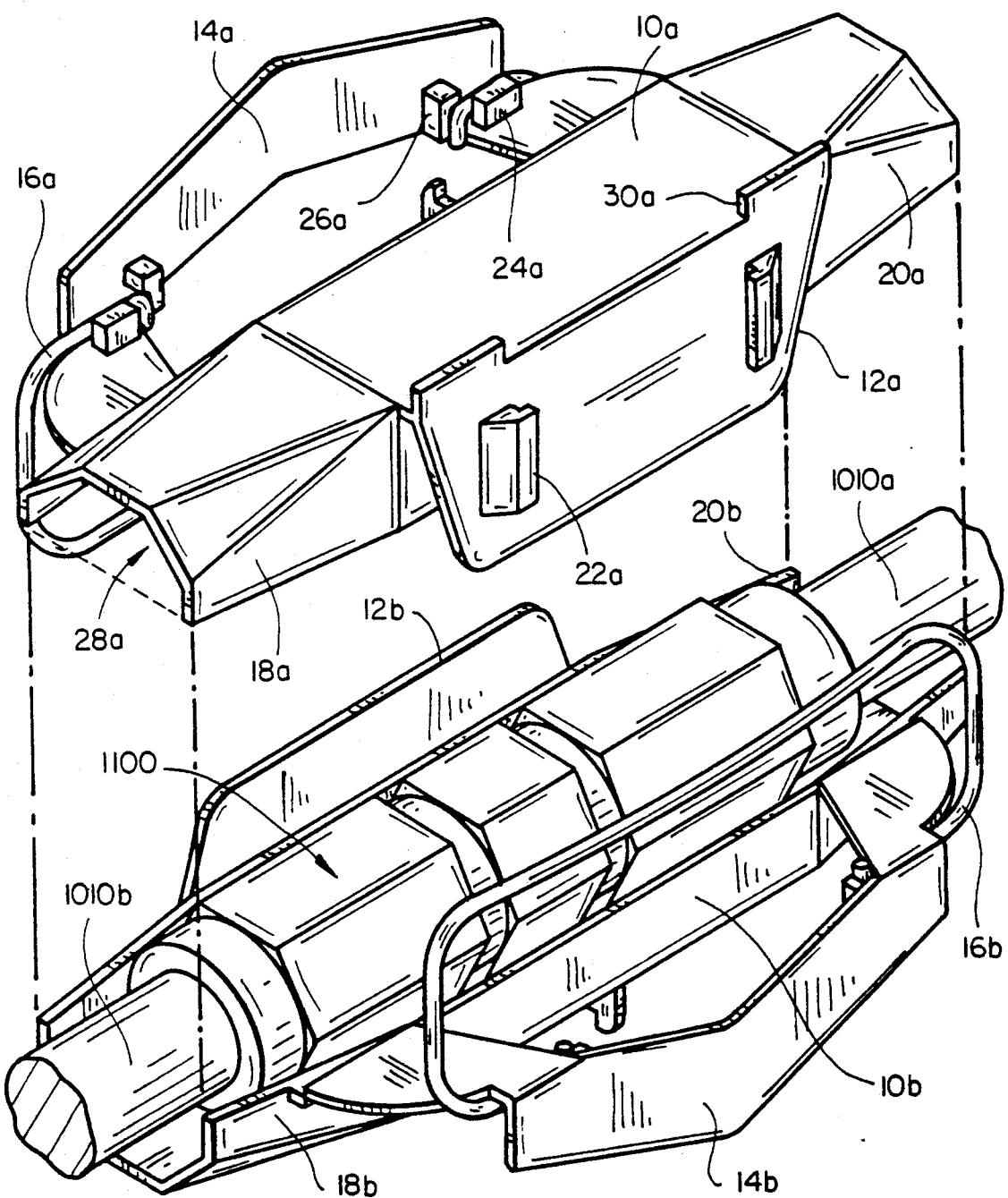
FIG_2

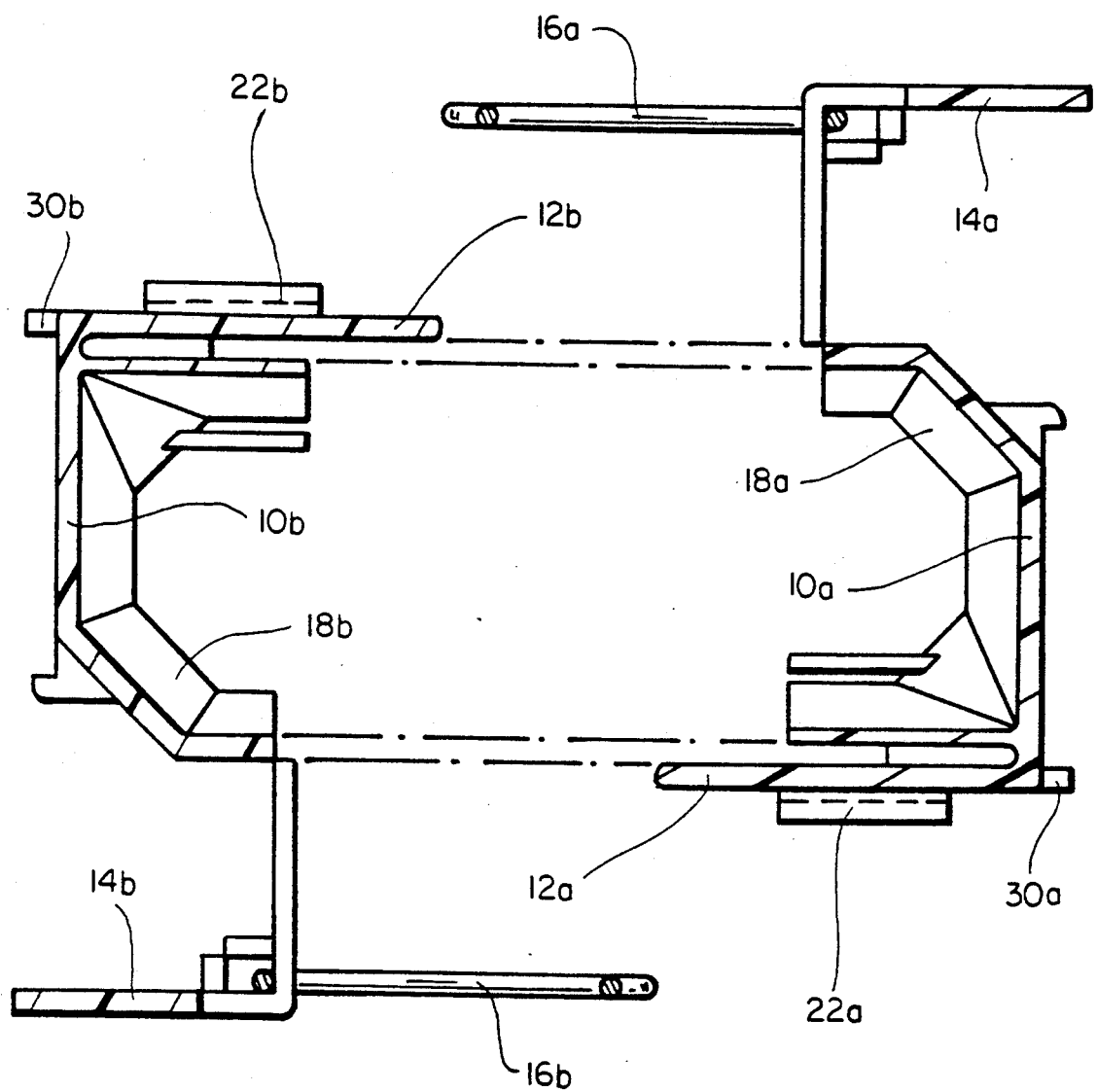
FIG_3a

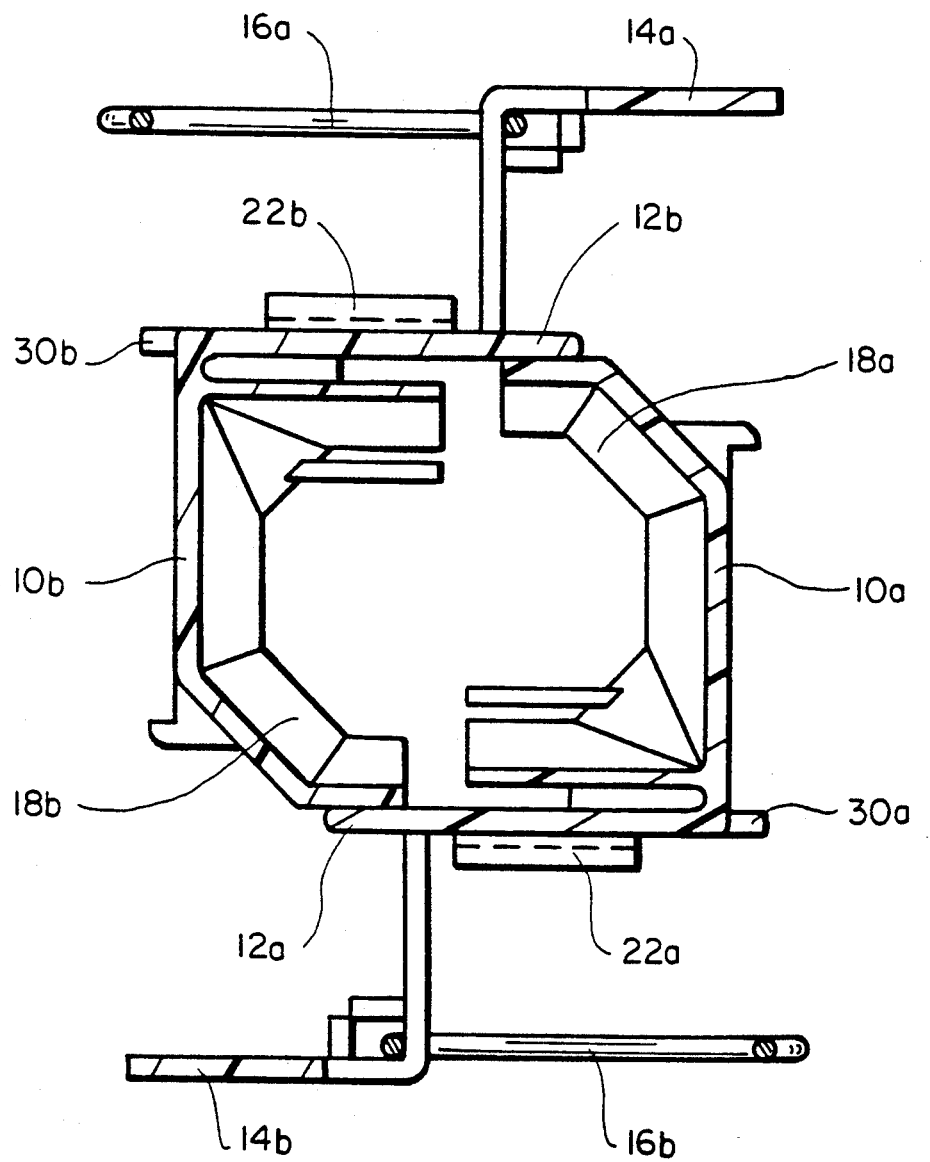
FIG_3b

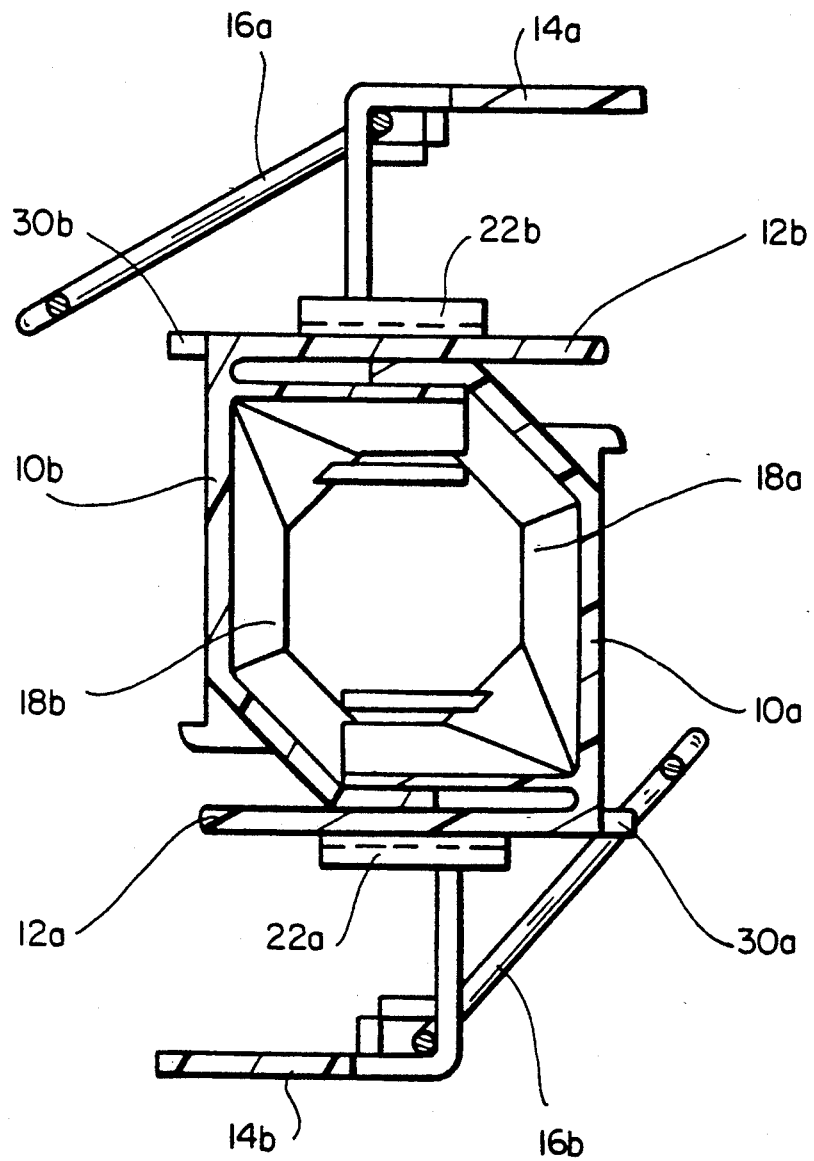
FIG_3c

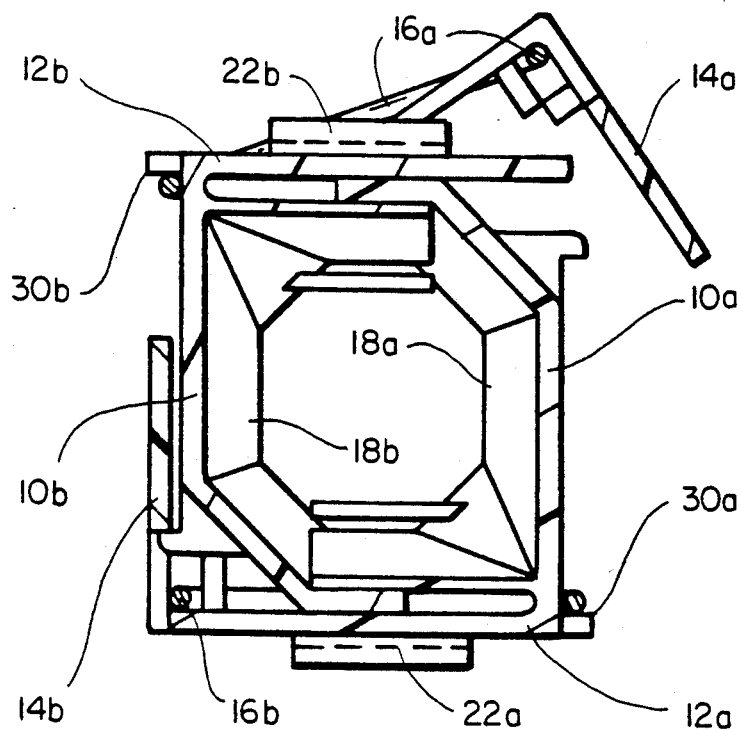
FIG_3d
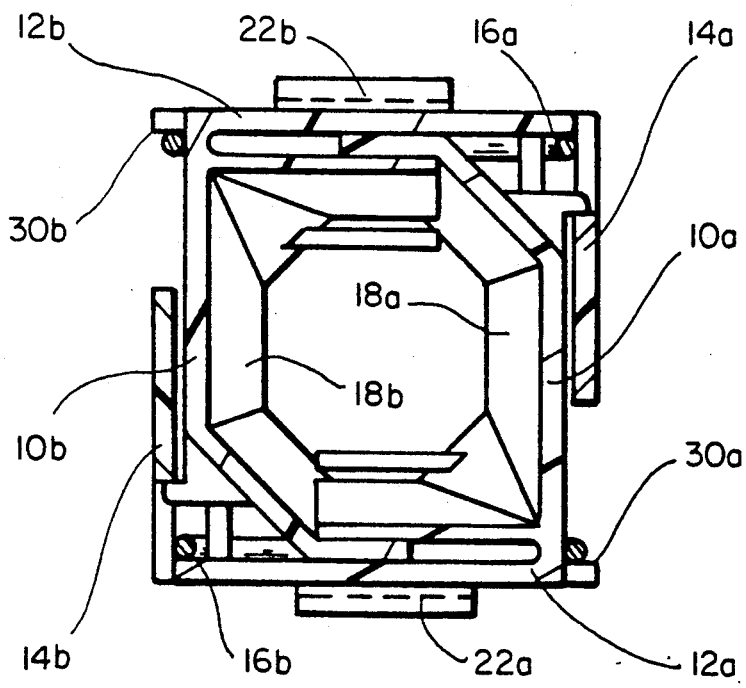
FIG_3e

HERMAPHRODITIC GEL CLOSURE

This invention relates to enclosures for substrates. More specifically, this invention relates to a gel-filled enclosure for a cable butt splice or an elongate substrate such as a telecommunications cable splice, coaxial cable splice, and the like.

BACKGROUND OF THE INVENTION

When an elongate substrate such as a coaxial or telephone or electrical cable is spliced or otherwise entered through its outer protected sheathing, it is necessary to protect the cable splice or the exposed interior conductors. More specifically, when a coaxial cable is spliced, both the exposed interior of the cable and the splice must be protected to permit a high quality signal to be transmitted across the splice. The fine wires of the telecommunications cable or the signal carrying conductor of the coaxial cable degrades when exposed to the harsh environments of the atmosphere or the buried earthen environment.

Within the past several years, gel materials such as silicone gels, polyurethane gels, polyurea gels, thermoplastic gels such as Kraton ® polymers and extender oils, and the like have been used to seal elongate substrates. These gels most effectively seal for reentry when the elongate substrate is sealed under compression and not potted around the substrate to be sealed. More specifically, the gel is generally cured apart from at least a portion of the substrate and thereafter brought into contact with the complete substrate and the gel placed under compression to seal the complete substrate. Suitable example gels and enclosures are illustrated in U.S. Pat. Nos. 4,610,738; 4,909,756; 4,859,809; 4,600,261; 4,634,207; 4,942,270; and 4,998,894. The complete disclosures of each of these patents is incorporated herein by reference for all purposes.

Each of these patents proposes a sealing solution for various substrates. In particular, U.S. Pat. No. 4,859,809 illustrates a spring-loaded enclosure to seal splices such as, inter alia, telephone cables. In practice, however, the springs may be somewhat difficult to install and remove and the enclosure may in the hermaphroditic embodiment tended to skate, i.e., move sideways relative to the halves, until the springs were installed. Thus, it would be highly desirable to have a hermaphroditic enclosure to minimize the number of parts while avoiding the difficulty of removing the springs as well as the tendencies of the enclosure to move along a horizontal axis which is substantially perpendicular to the elongate substrate axis prior to the connection of the springs.

SUMMARY OF THE INVENTION

The invention provides for previously recited desirable features as well as many other features obvious to the skilled artisan. More specifically, the closure comprises two hermaphroditic halves which may be identical (hermaphroditic) in the preferred embodiment. Each half includes a spring and a gel-filled molding. The two halves when juxtaposed cooperatively form an enclosure with springs on opposite sides. Each half includes a portion, fastened to the main body by a hinge, and preferably a living plastic hinge, which holds the spring captive and provides mechanical leverage for hand assmebly without the use of tools. A latch on the main body portion holds the hinged portion in closed position. Reentry can be effected by use of fingers or facilitated by a screwdriver to unhook the latch.

BRIEF DESCRIPTION OF THE DRAWINGS

FIG. 1 illustrates two halves of the enclosure snapped together around the substrate.

FIG. 2 illustrates an exploded view of the two halves in FIG. 1 exposing a coaxial cable splice.

FIG. 3a through FIG. 3e are cross-section illustrations of the two halves of the enclosure fitting together to form the sealed enclosure.

DETAILED DESCRIPTION OF THE INVENTION

The preferred embodiments of the enclosure will be illustrated by referring to the appended drawings. FIG. 1 illustrates the enclosure 100 comprising two like halves in the most preferred embodiment interleafed and locked in place around an elongate substrate 1000. The enclosure 100 is more clearly illustrated through exploded and cross-sectional views in FIGS. 2 and 3a-3e, which should be viewed together for the clearest understanding of the enclosure and its operation. The enclosure 100 can be fabricated out of any suitable substantially impervious material for the expected environments such as a metal or plastic or fiberglass, and the like. Plastic materials which can form a living hinge, such as polypropylene, without cracking are preferred although any suitable hinging mechanism can be incorporated into the enclosure by molding or other means known in the art.

An exploded view of the enclosure 100 is more clearly illustrated in FIG. 2. The elongate substrate 1000 of FIG. 1 is particularly illustrated as coaxial cables 1010a 1010b connected together by a cable splice 1100 therebetween. The cable splice 1100 is contained within the central portion of the enclosure 100 and surrounded by a suitable gel material contained therein upon the enclosure of the two halves. Suitable gel materials can be silicones, thermoplastic materials such as Kraton ® polymers and oil extenders, polyurethanes, polymers, and polyisobutylenes all with appropriate extenders, and the like. Suitable gels have a cone point depression of from about 50 to about 350 $(10^{-1}$ mm) and an ultimate elongation of at least about 200%. For ease of processability, polyurethanes or thermoplastic materials such as di- and tri-block polymers like poly(styrene-ethylenebutylene-styrene), poly(styrene-ethylenebutylene), poly(styrene-isoprene), styrene-butadiene polymers, i.e. Kraton ® or Solprene ® polymer materials are preferred.

The enclosure 100 is illustrated in the exploded view of FIG. 2 and FIGS. 3a through 3e and enumerated by a "a" and "b" letters for various numerals because the parts in the preferred embodiments are the same but two halves are required to form the enclosure. The enclosure 100 includes central portions 10a and 10b to contain either a plurality of cable splices or a coaxial cable connector splice 1100, as illustrated. Each central body 10a and 10b tapers at its ends 18a and 20a and 18b and 20b, respectively, to seal around the elongate substrate 1010a and 1010b.

Upon the fabrication of a one half unit, each of the ends at 18a, 18b, 20a, and 20b optionally contains a thin breakout portion solely illustrated as 28a to permit the filling of the unit with gel during manufacture. This section 28a is sufficiently thin so that it breaks away from the main body of the unit upon clamping around the elongate substrate. The thin unit 28a may optionally be sectioned in a pie-like fashion to provide gripping fingers for the elongate substrate upon breaking out as the unit is assembled about the substrate. Of course if gripping means are not necessary for the cable, then the body can be one rectangular unit without the tapering portions 18a and 18b and 20a and 20b. Additionally, the filling mold can optionally form temporary end dams when filling with thermoplastic gels to obviate the need for 28a when using cure-in-place gels such as silicone gels.

On opposite sides of the longitudinal bodies are a wing members 12a and 12b. The wing members form an elongate U shaped slot to slideably fix the opposite member upon assembly to avoid "skating," i.e., movement in a plane substantially bisecting the longitudinal axis of the elongate substrate. Each hinge member 14a and 14b rotates around its opposite member when the enclosure is assembled. Each hinge member 14a and 14b additionally includes a spring member 16a and 16b for latching to catch means such as protrusions 30a and 30b of wing members 12a and 12b, respectively. Any suitable material can be used for the spring members 16a and 16b such as aluminum or plastic but stainless steel or epoxy coated steel to resist corrosion is preferred. In the event that less expensive spring materials are desired, or the materials differ from the cable splice 1100, optionally wing members 12a and 12b can include a sacrificial anode, not illustrated, to assemble under a sacrificial anode holding means 22a ans 22b and be held in place by the springs. The springs are held in place by spring retaining means illustrated as elements 24a and 26a.

As illustrated in FIGS. 3a through 3e the two halves are assembled together around the elongate substrate and the springs are hooked around latch means 30a and 30b, respectively, and then each hinge member 14a and 14b is rotated about the hinge axis to stretch the spring and lock the enclosure as illustrated in FIG. 3e. In a preferred embodiment, the spring members 16a and 16b are designed to have a building of force before latching and be somewhat below maximum force upon full latching to avoid the popping open of the enclosure if impacted during installation or subsequent abuse. More specifically, the spring members 16a and 16b are unstretched as installed and stretched to a maximum but within their elastic limits. Alternatively, the parts may be proportioned such that the springs are stretched through a maximum to ensure that energy has to be exerted on hinge members 14a and 14b to overcome springing force and open the enclosure.

The invention has been described with respect to particularly preferred embodiment. Modifications which would be obvious to the ordinary skilled artisan are contemplated to be within the scope of the invention.

What is claimed is:

1. An enclosure for an elongate substrate which comprises:
    first and second substantially like members capable of fitting together to form an enclosure around a portion of an elongate substrate therebetween;
    each member includes a wing member to restrain the movement of the enclosure with respect to the other member along a horizontal axis which substantially bisects the longitudinal axis of the elongate substrate; and
    each member includes a hinge including a spring capable of latching to a catch member on the opposite side of the wing member.

2. The enclosure according to claim 1 wherein each hinge is a living hinge.

3. The enclosure according to claim 2 wherein the ends of the members are tapered towards the diameter of the elongated substrate.

4. The enclosure according to claim 3 wherein the ends of the members have thinned portions which breakaway upon assembly around an elongate substrate to provide a closed U-shaped configuration to facilitate retaining of gel placed therein prior to curing.

5. The enclosure according to claim 3 further including means for retaining a sacrificial anode on the exterior of the enclosure.

6. The enclosure according to claim 4 wherein the material, spring is selected from the group consisting of stainless steel, epoxy-coated steel, aluminum, or plastic.

7. The enclosure according to claim 5 further comprising a gel sealing material substantially filling each member wherein the gel sealing material is selected from the group consisting of a silicone gel, poly(styrene-ethylenebutylene-styrene) gel, a poly(styrene-ethylenebutylene) gel, a poly(styrene-isoprene) gel, a polyurea gel, or a polyurethane gel, having a cone point depression of from about 50 to about 350 ($10^{-1}$ mm) and an ultimate elongation of at least about 200%.

8. A kit-of-parts capable of being assembled to form an enclosure for an elongate substrate comprising two substantially identical members capable of fitting together to form the enclosure wherein each member includes a spring attached to a living hinge opposite to a catch-and-wing member of the member.

9. The kit-of-parts according to claim 8 further including a gel sealing material within each member.

10. The kit-of-parts according to claim 9 further including a sacrificial anode for each spring.

* * * * *

UNITED STATES PATENT AND TRADEMARK OFFICE
CERTIFICATE OF CORRECTION

PATENT NO. : 5,173,573
DATED : December 22, 1992
INVENTOR(S) : James W. Jervis

It is certified that error appears in the above-indentified patent and that said Letters Patent is hereby corrected as shown below:

Column 2, line 42, replace "polymers" with --polyureas--.

Claim 4, column 4, line 24, replace "breakaway" with --break away--.

Claim 6, column 4, line 31, replace "material," with --material of the--.

Signed and Sealed this

Twenty-fourth Day of January, 1995

Attest:

BRUCE LEHMAN

*Attesting Officer*    *Commissioner of Patents and Trademarks*